United States Patent
Masuda et al.

(10) Patent No.: US 9,531,316 B1
(45) Date of Patent: Dec. 27, 2016

(54) MOTOR CONTROL DEVICE AND MOTOR CONTROL METHOD

(71) Applicant: Panasonic Intellectual Property Management Co., Ltd., Osaka (JP)

(72) Inventors: Takahiro Masuda, Osaka (JP); Taro Kishibe, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/117,433

(22) PCT Filed: Sep. 25, 2015

(86) PCT No.: PCT/JP2015/004869
§ 371 (c)(1),
(2) Date: Aug. 8, 2016

(87) PCT Pub. No.: WO2016/051741
PCT Pub. Date: Apr. 7, 2016

(30) Foreign Application Priority Data

Sep. 30, 2014 (JP) .................................. 2014-200307

(51) Int. Cl.
*G05B 11/28* (2006.01)
*H02P 27/08* (2006.01)
(Continued)

(52) U.S. Cl.
CPC ................ *H02P 27/08* (2013.01); *H02P 6/08* (2013.01); *H02P 21/04* (2013.01)

(58) Field of Classification Search
CPC ............. H03M 3/30; H03M 3/39; H03M 3/43
(Continued)

(56) References Cited

U.S. PATENT DOCUMENTS

| 5,990,819 | A | * | 11/1999 | Fujimori | ............... | H03M 3/502 341/143 |
| 6,011,501 | A | * | 1/2000 | Gong | .................... | H03M 3/504 341/150 |

(Continued)

FOREIGN PATENT DOCUMENTS

| JP | 7-015972 | 1/1995 |
| JP | 2005-304095 | 10/2005 |
| JP | 2009-060175 | 3/2009 |

OTHER PUBLICATIONS

International Search Report of PCT application No. PCT/JP2015/004869 dated Oct. 27, 2015.

*Primary Examiner* — Rina Duda
(74) *Attorney, Agent, or Firm* — McDermott Will & Emery LLP

(57) ABSTRACT

A motor control device has a motor current detector for detecting current in windings to control the operation of a motor with a stator having three-phase windings. The motor control device includes a digital controller for outputting a PWM switching signal, a power converter for applying drive voltage to the windings using the PWM switching signal, a motor current detector for converting current flowing in the windings to analog voltage, a $\Delta\Sigma$ AD converter for converting the analog voltage to a 1-bit digital signal, an AD conversion decimating filter for generating a detected motor current value from the 1-bit digital signal, a clock generator for generating a clock for the $\Delta\Sigma$ AD converter and the AD conversion decimating filter, and a stop signal generator for generating a clock stop signal for stopping the clock of the clock generator for a predetermined period. The stop signal generator generates the clock stop signal with a predetermined pulse width based on a timing of the PWM switching signal, and the clock generator stops the clock for a period (Continued)

of the predetermined pulse width, using the clock stop signal.

8 Claims, 8 Drawing Sheets

(51) Int. Cl.
*H02P 6/08* (2016.01)
*H02P 21/04* (2006.01)

(58) Field of Classification Search
USPC .................................................. 318/599, 811
See application file for complete search history.

(56) References Cited

U.S. PATENT DOCUMENTS

| | | | | |
|---|---|---|---|---|
| 6,473,018 | B2* | 10/2002 | Ueno | H03M 3/494 |
| | | | | 341/143 |
| 7,142,142 | B2* | 11/2006 | Petersen | A61B 5/14551 |
| | | | | 341/143 |
| 2001/0030621 | A1* | 10/2001 | Matsumoto | H03M 3/484 |
| | | | | 341/143 |
| 2005/0218853 | A1 | 10/2005 | Kokami | |
| 2007/0132618 | A1* | 6/2007 | Petersen | A61B 5/14551 |
| | | | | 341/143 |
| 2007/0195451 | A1 | 8/2007 | Kokami | |
| 2013/0278197 | A1* | 10/2013 | Sasaki | H02P 23/00 |
| | | | | 318/490 |
| 2015/0036238 | A1* | 2/2015 | Ferrario | G11B 5/022 |
| | | | | 360/75 |

* cited by examiner

MOTOR CONTROL DEVICE AND MOTOR CONTROL METHOD

CROSS-REFERENCE TO RELATED APPLICATIONS

This application is a U.S. national stage application of the PCT International Application No. PCT/JP2015/004869 filed on Sep. 25, 2015, which claims the benefit of foreign priority of Japanese patent application 2014-200307 filed on Sep. 30, 2014, the contents all of which are incorporated herein by reference.

TECHNICAL FIELD

The present invention relates to motor control devices and motor control methods for freely controlling motor rotation by applying drive voltage generated by the PWM control to a winding of a motor to control current, and more particularly to motor control devices equipped with a function to detect a value of current generated by applying the drive voltage to the winding and motor control methods of these devices.

BACKGROUND ART

A position, speed, and torque of a servo motor used in FA (Factory Automation) are controlled to follow a drive command (position command) from a host device (host controller), and digital control is broadly adopted, using a microprocessor as its control operation device. In a general PWM (Pulse Width Modulation) control system for controlling motor torque, there is a method of detecting and using a value of current flowing to a winding of the motor (hereafter referred to as "motor current"). In digital control of this method, a motor current value is periodically detected and the motor current is controlled to match a current command value, typically using PID control (proportional+integral+differential control). Torque output from a surface permanent magnet synchronous motor used in the servo motor is proportional to motor current, and thus the torque output from the motor can be freely controlled by matching the motor current value with the current command value by using the PWM control.

FIG. 8 is a configuration of conventional motor control device 90 including an inverter. In this conventional motor control device 90, current detecting resistance 91 for detecting a motor current value is provided between power converter 98, which is an inverter, and a winding of motor 30. AD (analog-digital) conversion unit 95 applies digital conversion to a voltage generated between both terminals of current detecting resistance 91 as the motor current flows, and supplies its digital data Di to digital controller 97. Conventionally, the motor current is generally detected with this configuration. Recently, however, the use of $\Delta\Sigma$ (delta sigma) AD converter 92, as shown in FIG. 8, in AD conversion unit 95 has been proposed with respect to less occurrence of gain error and offset (e.g., PTL1). This type of AD conversion unit 95 includes, for example, a photo coupler and digital filter, in addition to $\Delta\Sigma$ AD converter 92.

However, in the configuration of driving the motor using the PWM control, this $\Delta\Sigma$ AD converter is likely affected by leak current due to the PWM control.

More specifically, in the PWM control system, voltage applied to the motor is controlled by switching a switching element. Therefore, a leak current occurs at a moment of switching. Normally, the leak current flows to a grounded part typically through a casing and wiring. However, the leak current also flows via shunt resistance, and voltage at both ends of the shunt resistance changes by this leak current. The $\Delta\Sigma$ AD converter then converts this voltage to a 1-bit digital signal. Accordingly, a detected current value after an AD conversion decimating filter includes unwanted current component that is not originally flowing in the motor.

In the digital control, the unwanted current component is processed as disturbance, and voltage that cancels the disturbance is applied to the motor, causing undesired torque in the motor. In particular, at the time of servo lock and low-speed rotation in which the current flowing in the motor is small and switching timings of phases tend to overlap, an influence of the leak current becomes relatively large. Accordingly, a minute vibration of the motor output shaft occurs due to undesired torque even in the servo-lock state in which the motor output shaft should be still under normal conditions.

CITATION LIST

Patent Literature

PTL1 Japanese Patent Unexamined Publication No. H7-15972

SUMMARY OF THE INVENTION

A motor control device of the present invention has a motor current detector for detecting current in windings of a motor with a stator having three-phase windings, so as to control the operation of the motor. The motor control device includes a digital controller for outputting a PWM switching signal based on an operation command from a host device, positional information from an encoder, and a detected motor current value that is a value of current in the windings, a power converter for applying drive voltage to the windings by turning on and off a switching element based on the PWM switching signal, a motor current detector for converting current flowing in the windings by the drive voltage to analog voltage, a $\Delta\Sigma$ AD converter for converting the analog voltage to a 1-bit digital signal, an AD conversion decimating filter for converting the 1-bit digital signal to a multi-bit digital signal and outputting it as the detected motor current value, a clock generator for generating a clock for operating the $\Delta\Sigma$ AD converter and the AD conversion decimating filter, and a stop signal generator for generating a clock stop signal that stops the clock of the clock generator for a predetermined period. The stop signal generator generates the clock stop signal with a predetermined pulse width based on a timing of change of the PWM switching signal. The clock generator uses the clock stop signal to stop the operation clock for a period of the predetermined pulse width.

A motor control method of the present invention is a motor control method for a motor control device that controls the operation of a motor with a stator having three-phase windings. This motor control device includes a digital controller for outputting a PWM switching signal based on an operation command from a host device, positional information from an encoder, and a detected motor current value that is a value of current in the windings, a power converter for applying drive voltage to the windings by turning on and off a switching element based on the PWM switching signal, a motor current detector for converting current flowing in the windings by the drive voltage to analog voltage, a $\Delta\Sigma$ AD converter for converting the analog voltage to a 1-bit digital signal, an AD conversion decimating filter for converting the 1-bit digital signal to a multi-bit digital signal and outputting it as a detected motor current value, a clock generator for generating a clock for operating the ΔΣ AD converter and the AD conversion decimating filter, and a stop signal generator for generating a clock stop signal that stops the clock of the clock generator for a predetermined period. The motor control method of this motor control device comprises the steps of generating the clock stop signal with predetermined pulse width based on a timing of change of the PWM switching signal, and stopping the clock for a period of the predetermined pulse width, using this clock stop signal.

The motor control device and the motor control method enable to reduce deterioration in detection accuracy by leak current due to PWM switching. Accordingly, undesired torque generated in the motor can be reduced to suppress a minute vibration.

DESCRIPTION OF EMBODIMENTS

Exemplary embodiments of the present invention are described below with reference to drawings. The present invention is not limited to the exemplary embodiments in any way.

First Exemplary Embodiment

Figure 1:
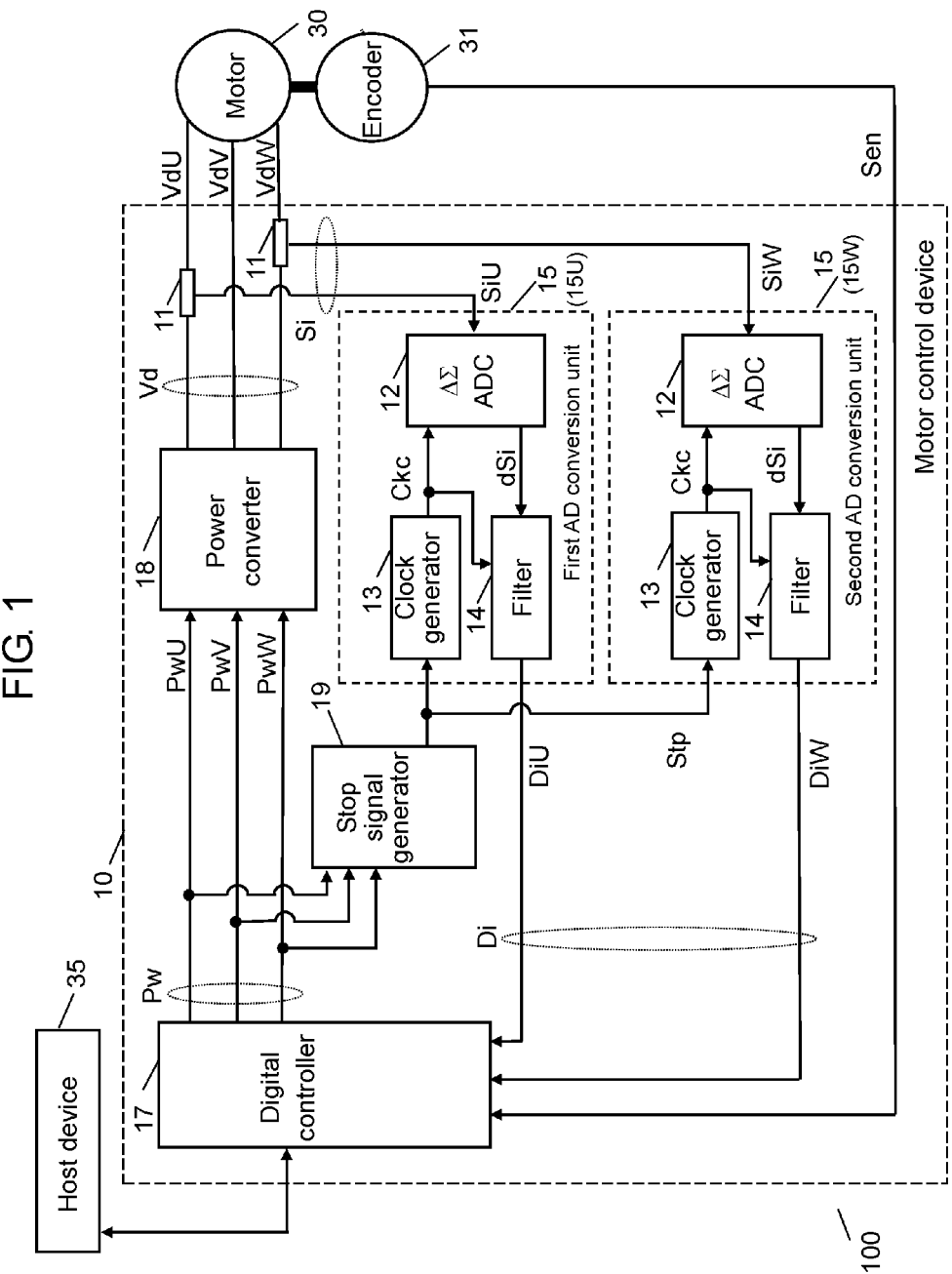
FIG. 1 is a configuration of a motor control system including a motor control device in accordance with a first exemplary embodiment of the present invention.
Figure 2:
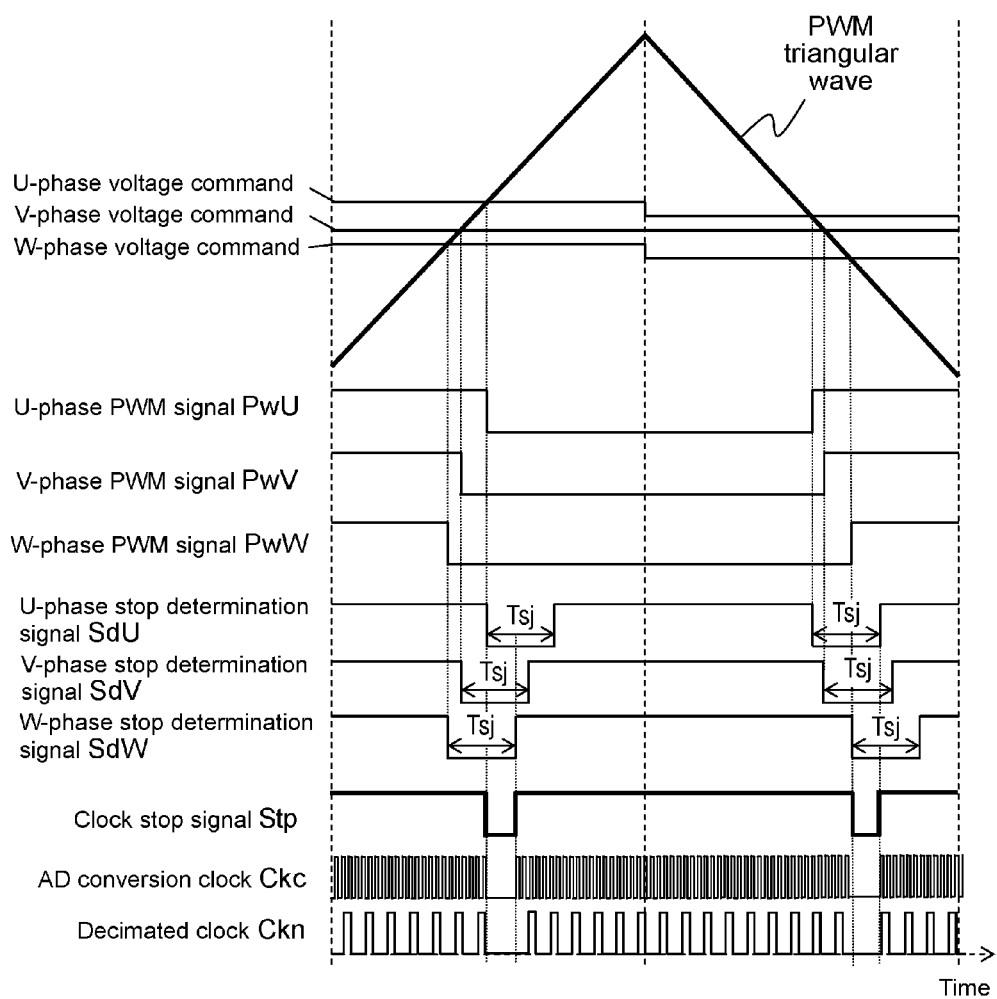
FIG. 2 is an operating waveform chart of the operation of an AD converter used for detecting a motor current in the motor control device.

FIG. 1 is a configuration of a motor control system including a motor control device in the first exemplary embodiment. FIG. 2 is an operating waveform chart of the operation of an AD converter used for detecting a motor current.

As shown in FIG. 1, motor control system 100 is configured to control the operation of motor 30 by motor control device 10 according to command control of host device 35.

Host device 35 is configured with, for example, a personal computer, and controls motor control device 10 typically by commands. Host device 35 and motor control device 10 are connected to allow communication typically via a control bus line. A command from host device 35 is transmitted to motor control device, and information from motor control device 10 is transmitted to host device 35.

A three-phase brushless motor that is broadly used with respect to its efficiency and controllability is suitable for motor 30 in FIG. 1. Motor 30, which is the three-phase brushless motor, includes a stator in which windings of each of U phase, V phase, and W phase are wound around a stator core, and a permanent magnet rotor. The rotor rotates by applying drive voltage Vd generated in motor control device 10 to U-phase windings as drive voltage VdU, V-phase windings as drive voltage VdV, and W-phase windings as drive voltage VdW. To detect a rotating position of the rotor, encoder 31 is disposed near the rotor. Encoder 31 outputs detected rotor position information to motor control device 10 as positional information Sen.

Motor control device 10 further includes digital controller 17 for controlling the rotation of motor 30, power converter 18 for driving the windings of motor 30, and motor current detector 11, AD converter 15, and stop signal generator 19 for detecting and processing motor current.

Digital controller 17 is configured with DSP (Digital Signal Processor) and software of microcomputer, or ASIC (Application Specific Integrated Circuit) and a logic circuit of FPGA (Field Programmable Gate Array). In other words, digital controller (hereafter referred to as simply "controller") 17 is configured to execute processes according to software indicating processing procedures, such as a program. As for signals to be processed, controller 17 mainly processes digital signals configured with data strings in which data of a predetermined number of bits are aligned.

Host device 35 transmits information on operation commands including position, speed, and torque to controller 17. Controller 17 transmits information on motor control device 10 to host device 35. In addition to this communication function for transmitting information, controller 17 controls the rotation of motor 30 to control the operation, such as speed and position, so that motor 30 executes a predetermined operation.

As an example of specific processing by controller 17, controller 17 executes the next control based on feedback control. Controller 17 generates a speed command by position control calculation, using an operation command for position from host device 35 and positional information Sen of encoder 31. Then, controller 17 calculates a motor speed corresponding to an actual speed of motor 30 by differentiating positional information Sen, and then calculates a current command by speed control calculation, using the motor speed and speed command. Next, controller 17 calculates a voltage command for each phase by current control calculation, using detected U-phase motor current value DiU and detected W-phase motor current value DiW obtained via motor current detector 11 and AD converter 15 and calculated current command. By applying PWM (pulse width modulation) using calculated voltage command, controller 17 outputs U-phase PWM signal PwU, V-phase PWM signal PwV, and W-phase PWM signal PwM as PWM switching signals (hereafter referred to as "PWM signal") Pw for switching power converter 18.

More specifically, controller 17 generates PWM signal Pw to which PWM is applied in the next way. First, controller 17 uses an up-down counter to generate a PWM triangular wave that has a triangular waveform for applying PWM. Controller 17 then compares the PWM triangular waveform and the voltage command calculated by current control calculation to generate PWM signal Pw.

An upper part of FIG. 2 shows these PWM triangular wave, voltage command, and PWM signals Pw (PwU, PwV, and PwW). As shown in FIG. 2, in a period that the level of PWM triangular wave gradually increases, PWM signal Pw starts to fall from a high level to low level at a point the level of PWM triangular wave exceeds the level of voltage command. Then, in a period that the level of PWM triangular wave gradually decreases, PWM signal Pw starts to rise from the low level to high level at a point the level of PWM triangular wave becomes below the level of voltage command. By repeating this operation, controller 17 generates PWM signal Pw configured with a pulse width corresponding to the voltage command level or duty-ratio pulse train for each phase. PWM signal Pw generated in this way is supplied to power converter 18.

Power converter 18 receives PWM signal Pw from digital controller 17, and generates and applies drive voltage Vd as U-phase drive voltage VdU, V-phase drive voltage VdV, and W-phase drive voltage WdW to windings of motor 30 via motor wires, respectively. Power converter 18 is a so-called inverter, and is configured with power elements, such as IGBT (Insulated Gate Bipolar Transistor) and diode. In other words, power converter 18 switches, i.e., turns on and off, voltage supplied from the power source based on PWM signal Pw, using a switching element such as IGBT, to generate drive voltage Vd. Recently, an integrated component of IPM (Intelligent Power Module) with built-in pre-drive circuit for driving a power element is often used.

Motor current detector 11 detects an amount of motor current flowing in the windings when drive voltage Vd is applied to the windings, and output the current amount as current detection signal Si. More specifically, the motor current flowing to a U-phase motor wire and W-phase motor wire is converted to voltage separately, and they are output as U-phase current detection signal SiU and W-phase current detection signal SiW. As motor current detector 11, shunt resistance for small motor current and CT (Current Transfer) for large current are generally used. Current detection signal Si output from motor current detector 11 is supplied to AD converter 15.

AD converter 15 is, as shown in FIG. 1, configured with first AD conversion unit 15U to which U-phase current detection signal SiU is supplied, and second AD conversion unit 15W to which W-phase current detection signal SiW is supplied. Each AD converter 15 is configured with $\Delta\Sigma$ AD converter 12, AD conversion decimating filter 14, and clock generator 13 to convert supplied analog signal to a digital signal and output it. In particular, the exemplary embodiment employs aforementioned $\Delta\Sigma$ AD converter (hereafter simply referred to as "AD converter") 12, which is $\Delta\Sigma$ type analog-digital converter.

Figure 3:
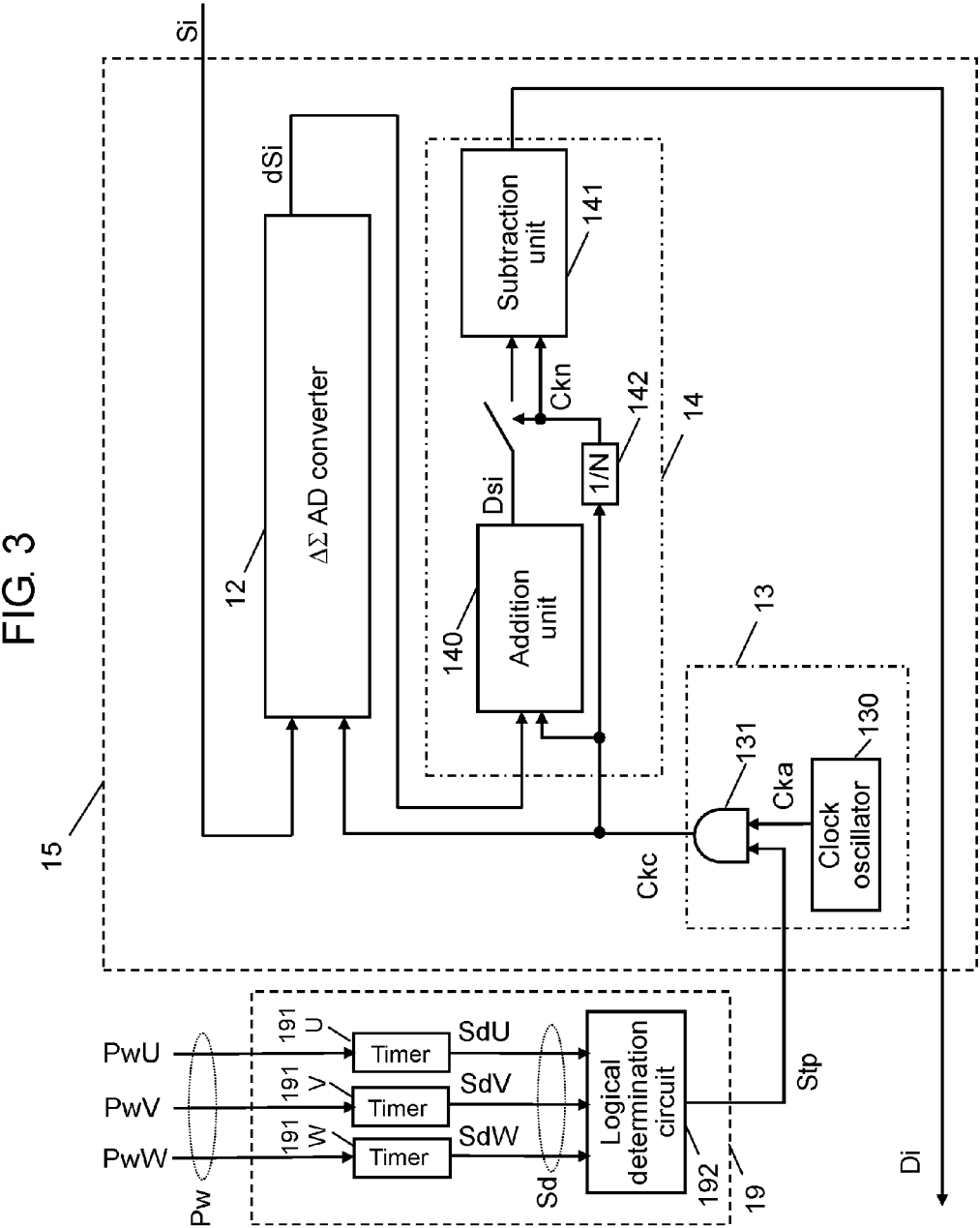
FIG. 3 is a configuration of the AD converter in the motor control device.

FIG. 3 is a circuit diagram of AD converter 15 and stop signal generator 19 to be detailed below.

In AD converter 15 in FIG. 3, clock generator 13 includes clock oscillator 130 and AND gate 131. Clock oscillator 130 oscillates and generates source clock Cka that determines a conversion period of AD converter 12. AND gate 131 produces a logical product of source clock Cka and clock stop signal Stp, and outputs it as AD conversion clock CKc. Clock stop signal Stp is detailed below. A frequency of source clock Cka is determined based on AD conversion resolution required for current control of digital controller 17 and allowable delay due to decimating (thinning) by the filter. Normally, a frequency of several tens of MHz is used.

Next, AD converter 12 includes a comparator for comparing, for example, with a threshold, and compares supplied current detection signal Si with the threshold. Then, AD converter 12 binarizes the comparison result to convert to a 1-bit digital signal. AD converter 12 then outputs this converted 1-bit digital signal as AD conversion signal dSi at every AD conversion clock Ckc. In other words, AD conversion signal dSi output from AD converter 12 is a signal configured with a pulse, and high and low levels of this signal correspond to 1 and 0 of the 1-bit digital signal. In this way, $\Delta\Sigma$ AD converter 12 converts input analog voltage to 1-bit digital signal.

AD conversion decimating filter (hereafter referred to as "decimation filter") 14 is a so-called decimation filter, configures a digital filter called a sinc filter whose frequency characteristic is sinc function, and includes addition unit 140 including an adder and subtraction unit 141 including a subtractor. Addition unit 140 generates multi-bit addition data Dsi by integrating AD conversion signal dSi that is the 1-bit digital signal output from AD converter 12 with the adder at every AD conversion clock Ckc. The number of bits of this addition data Dsi corresponds to the AD conversion resolution of AD converter 15. Next, AD conversion clock divider 142 generates decimated (thinned) clock Ckn in which AD conversion clock Ckc is divided into 1/N (N is the nth power of 2, n is an integer). In other words, AD conversion clock Ckc is divided from AD conversion clock Ckc at a high clock rate, a so-called over-sampling clock, to decimated clock Ckn at a predetermined low clock rate. Subtraction unit 141 operates per this decimated clock Ckn to obtain a frequency characteristic in sinc function by calculating difference between the previous and current values of addition data Dsi. A low-pass filter is achieved by decimation filter 14 configured with these addition unit 140 and subtraction unit 141. This filter cuts a high-frequency noise and also generates detected motor current Di after converting and filtering to the predetermined number of resolution bits.

Again in FIG. 1, detected motor current DiU generated by first AD conversion unit 15U and detected motor current DiW generated by second AD conversion unit 15W in this way are supplied to digital controller 17. Digital controller 17 executes current control calculation using supplied detected motor currents DiU and DiW to calculate voltage commands for generating drive voltages Vd, respectively.

As described above, motor control device 10 generates drive voltage Vd whose drive waveform for driving windings is quasi-formed with PWM pulse by switching the switching element connected to the power source. Therefore, a leak current occurs at the moment of switching. This leak current affects AD converter 15 as noise. As a result, accuracy of detected motor currents DiU and DiW may be deteriorated. Accordingly, in the exemplary embodiment, motor control device 10 further includes stop signal generator 19, as shown in FIG. 1. In the exemplary embodiment, this stop signal generator 19 stops the operation of AD converter 15 for a predetermined period to suppress influence of leak current.

As shown in FIG. 1 and FIG. 3, PWM signal Pw of each phase (PwU, PwV, and PwW) is supplied to stop signal generator 19. Stop signal generator 19 uses an edge where the level of supplied PWM signal Pw changes to generate clock stop signal Stp with predetermined timing and predetermined pulse width. This clock stop signal Stp is supplied to AD converter 15, and is also supplied to one input of AND gate 131 of clock generator 13. With this configuration, source clock Cka is not output from clock generator 13, using AND gate 131, when clock stop signal Stp indicates a clock stop. Conversely, when clock stop signal Stp does not indicate a clock stop, clock generator 13 outputs source clock Cka as AD conversion clock Ckc.

More specifically, FIGS. 1 to 3 show an example of a clock stop when clock stop signal Stp is at a low level. First, as shown in FIG. 1 and FIG. 3, stop signal generator 19 receives U-phase PWM signal PwU, V-phase PWM signal PwV, and W-phase PWM signal PwW. As shown in FIG. 2, stop signal generator 19 generates stop determination signal Sd for each of U phase, V phase and W phase that becomes a low level only for a predetermined period from switching timing of each of U-phase PWM signal PwU, V-phase PWM signal PwV, and W-phase PWM signal PwW, typically using a timer and one-shot circuit.

In an example of configuration of stop signal generator 19 shown in FIG. 3, U-phase PWM signal PwU is input to timer 191U to output stop determination signal SdU. V-phase PWM signal PwV is input to timer 191V to output stop determination signal SdV. W-phase PWM signal PwW is input to timer 191W to output stop determination signal SdW. With this configuration, each stop determination signal Sd that keeps a signal at a low level only for a period of time Tsj as a predetermined period is output at rising and falling timing of PWM signal Pw.

Then, logical determination circuit 192 generates and outputs clock stop signal Stp by determining logical values of stop determination signal SdU, stop determination signal SdV, and stop determination signal SdW. More specifically, FIG. 2 shows an example that logical determination circuit 192 generates and outputs clock stop signal Stp shown in FIG. 2 by the OR operation of these stop determination signals SdU, SdV, and SdW. Time Tsj is set longer than duration of leak current due to switching (in general, several microseconds).

Next, in clock generator 13 of AD converter 15, presence/absence of outputting source clock Cka is controlled by clock stop signal Stp from stop signal generator 19, and AD conversion clock Ckc is output as a clock signal including clock stop period. A specific example is show in FIG. 2. When clock stop signal Stp is at low level, AD conversion clock Ckc and decimated clock Ckn are halted, and the operations of AD converter 12 and decimation filter 14 are also stopped.

With this configuration of stopping the operation of AD converter 15 for a predetermined period immediately after PWM switching, deterioration in detection accuracy of current detection signal Si due to leak current generated within this period can be reduced. Since current detection signal Si, in which mixing of unwanted component is suppressed, can be achieved, undesired torque generated in the motor can be reduced to suppress a minute vibration.

The above description refers to an example of generating clock stop signal Stp by the OR operation of stop determination signals Sd. However, clock stop signal Stp may be generated in the following way.

Figure 4:
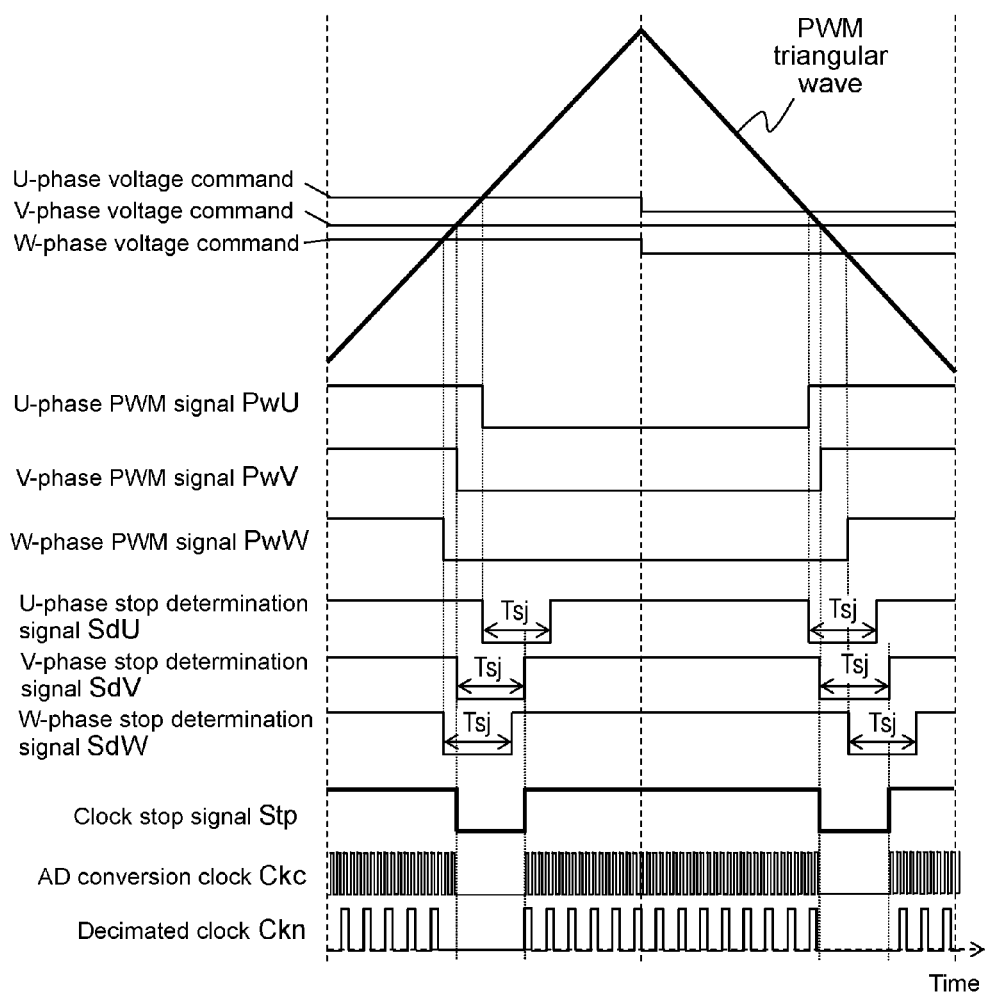
FIG. 4 is an operating waveform chart of another configuration for generating clock stop signal Stp in the motor control device.

FIG. 4 is an operating waveform chart of another configuration for generating clock stop signal Stp. A configuration with waveform of clock stop signal Stp shown in FIG. 4 is also applicable. More specifically, clock stop signal Stp in FIG. 4 becomes a low level when logical determination circuit 192 determines that stop determination signal Sd is at low level in at least two or more phases.

This configuration can also stop the operation of AD converter 15 for a predetermined period immediately after PWM switching. Deterioration in detection accuracy of current detection signal Si due to leak current generated in this period can thus be reduced. Still more, this configuration can also expand the clock stop time to further reduce deterioration in detection accuracy.

Figure 5:
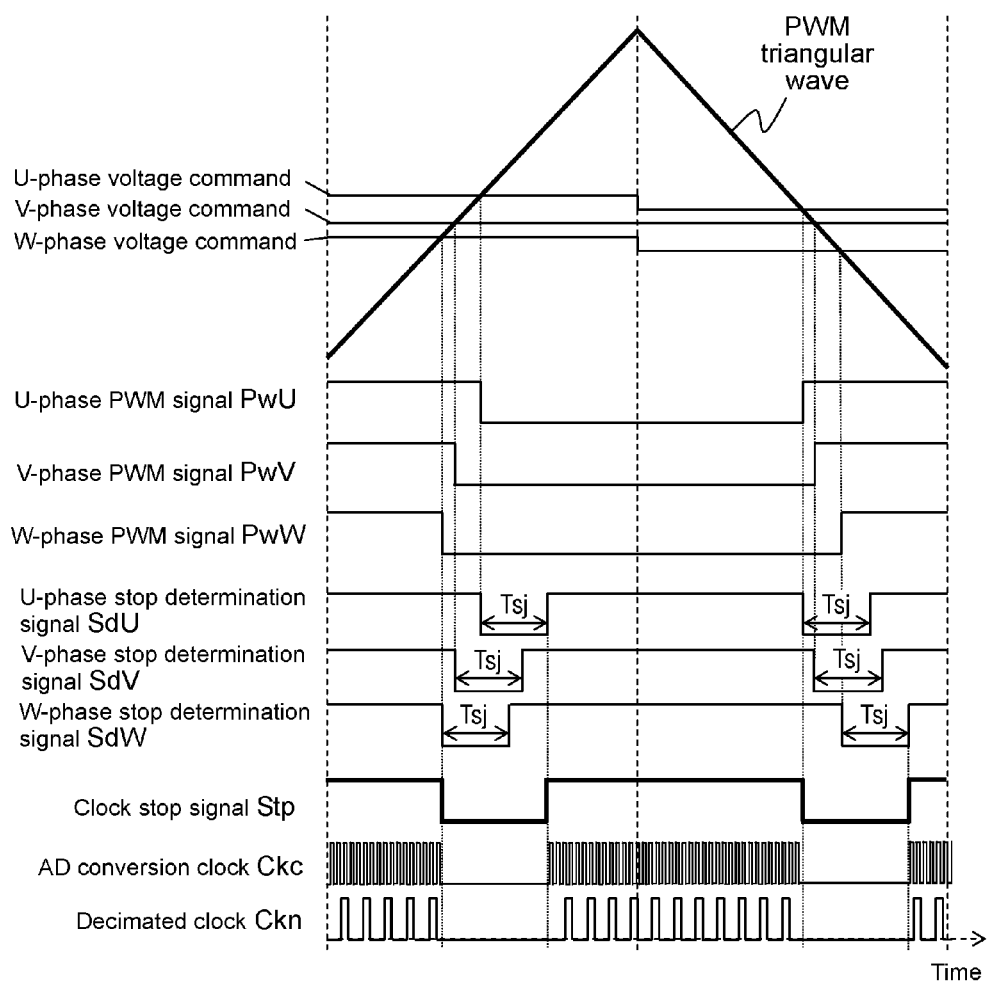
FIG. 5 is an operating waveform chart of still another configuration for generating clock stop signal Stp in the motor control device.

FIG. 5 is an operating waveform chart of still another configuration for generating clock stop signal Stp. A configuration with waveform of clock stop signal Stp shown in FIG. 5 is also applicable. More specifically, clock stop signal Stp in FIG. 5 is generated based on the AND operation of U-phase, V-phase, and W-phase stop determination signals Sd in logical determination circuit 192.

This configuration also enables to stop the operation of AD converter 15 for a predetermined period immediately after PWM switching. Deterioration in detection accuracy of current detection signal Si due to leak current generated in this period can be reduced. Still more, this configuration can reduce deterioration in detection accuracy due to leak current even if switching in each phase varies during motor rotation.

Second Exemplary Embodiment

Figure 6:
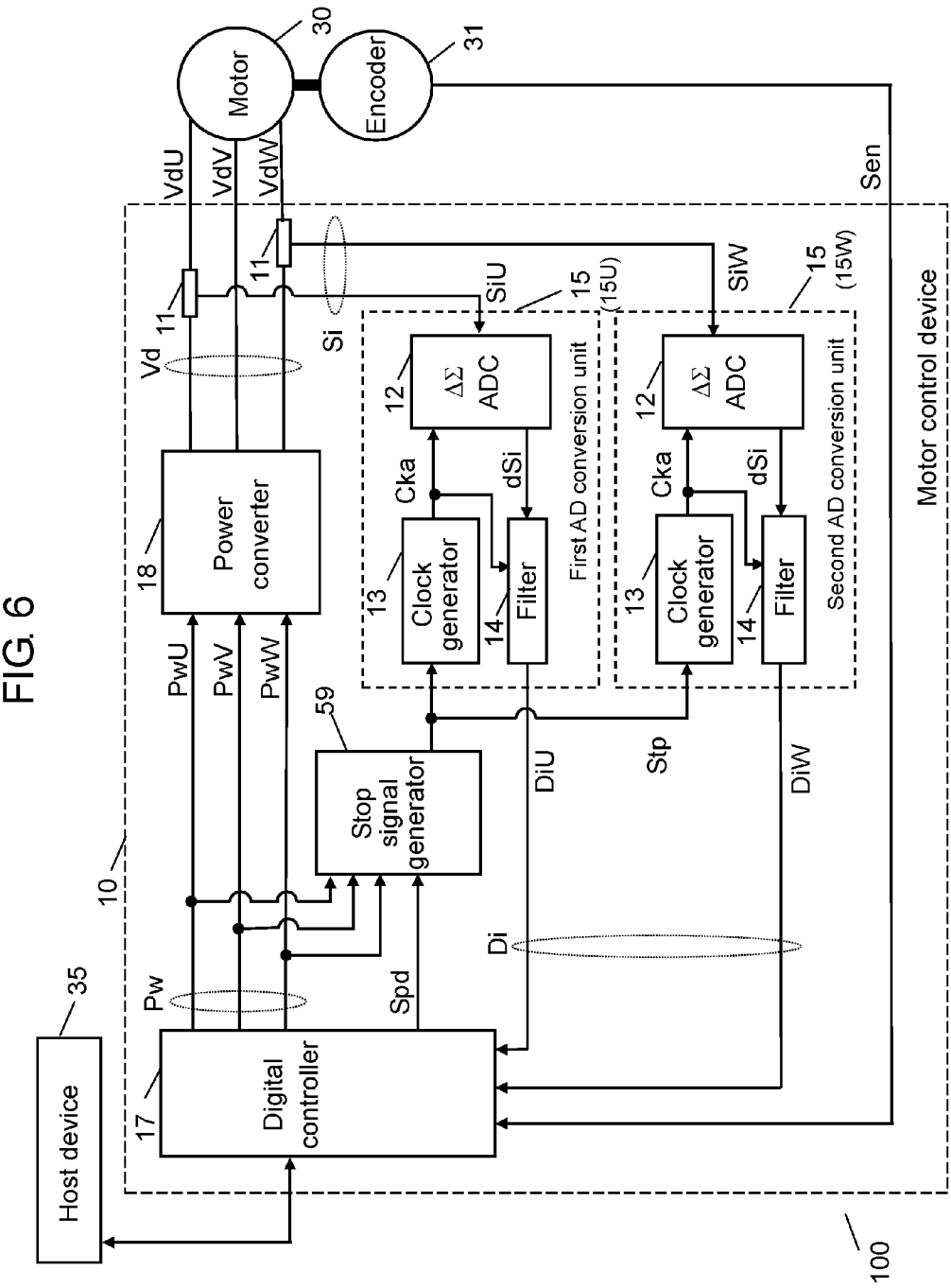
FIG. 6 is a configuration of a motor control system including a motor control device in accordance with a second exemplary embodiment of the present invention.

FIG. 6 is a configuration of a motor control system including the motor control device in the second exemplary embodiment of the present invention. A point that differs from the first exemplary embodiment in FIG. 1 is the configuration for generating clock stop signal Stp in stop signal generator 59. This is described below. Components same as those in FIG. 1 are given the same reference marks to omit detailed description.

First, as described in Background Art, an influence of leak current relatively increases when motor 30 is servo-locked, which is the stop state, and at low-speed rotation in low driving. The configuration in the exemplary embodiment controls the aforementioned operation stop of AD converter 15 depending on the drive state.

For this control, digital controller 17 supplies motor speed Spd indicating a currently-controlled speed to stop signal generator 59 in the exemplary embodiment, in addition to U-phase PWM signal PwU, V-phase PWM signal PwV, and W-phase PWM signal PwW.

Stop signal generator 59 monitors motor speed Spd from digital controller 17 and sets clock stop signal Stp to high level when motor speed Spd exceeds a predetermined speed (speed threshold), and outputs clock stop signal Stp based on stop determination signal described in the first exemplary embodiment when the speed is lower than the speed threshold. In the configuration in FIG. 6 in the exemplary embodiment, stop signal generator 59 determines that motor 30 is in the low-drive state that is easily affected by leak current only when the speed of motor 30 is determined to be lower than the speed threshold. In this state, the clock stop control is executed for a predetermined period by clock stop signal Stp. On the other hand, stop signal generator 59 releases this clock stop control when the speed of motor 30 exceeds the speed threshold. The speed threshold is a speed that an influence of leak current due to PWM switching relative to motor current becomes small, and is several hundreds of r/min.

Figure 7:
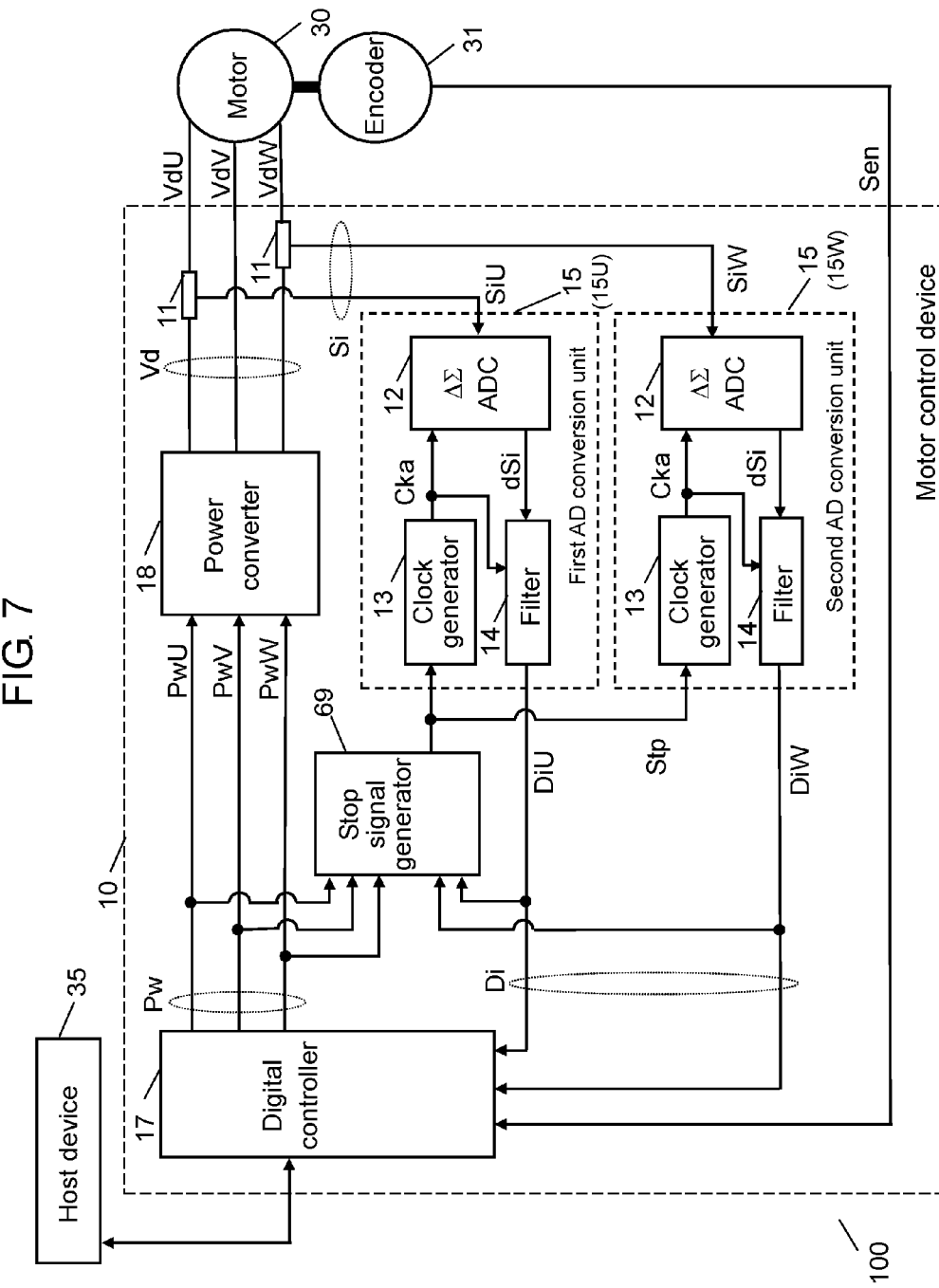
FIG. 7 is another configuration of the motor control system including the motor control device.
Figure 8:
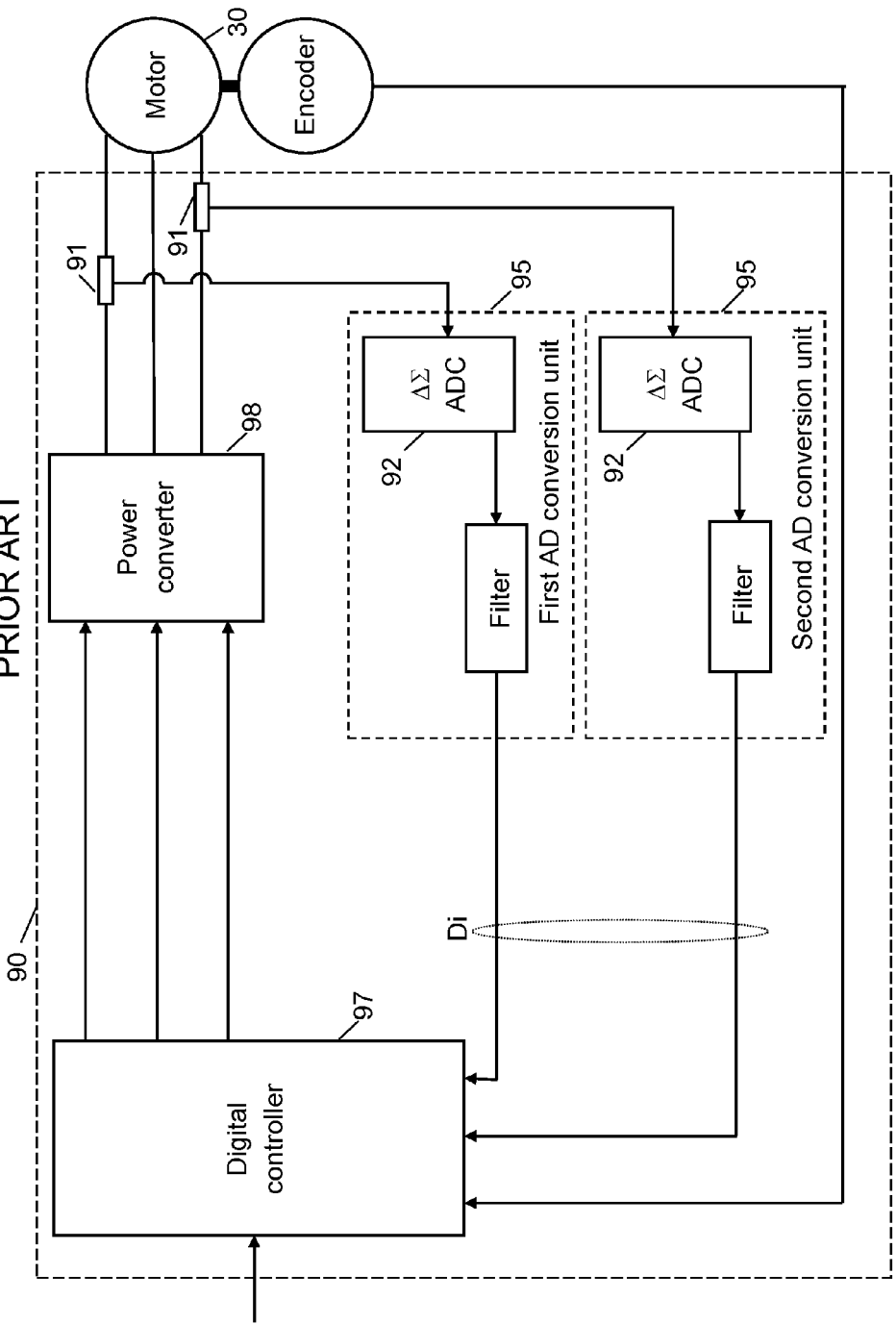
FIG. 8 is a configuration of a conventional motor control device.

FIG. 7 is still another configuration of a motor control system including the motor control device in the second exemplary embodiment of the present invention. FIG. 7 shows another example of configuration for stopping the operation of AD converter 15 depending on the drive state. In comparison with FIG. 6, motor control device 10 in FIG. 7 includes stop signal generator 69.

To achieve this control, digital controller 17 supplies detected motor current Di (DiU and DiW) to stop signal generator 69 in motor control device 10 in FIG. 7, in addition to U-phase PWM signal PwU, V-phase PWM signal PwV, and W-phase PWM signal PwW.

Stop signal generator 69 monitors an amplitude of U-phase detected motor current DiU or W-phase detected motor current DiW, sets clock stop signal Stp to a high level when the detected motor current exceeds a predetermined value (current threshold), and outputs clock stop signal Stp based on the stop determination signal described in the first exemplary embodiment when the detected motor current is lower than the current threshold. In the configuration in FIG. 7 in the exemplary embodiment, stop signal generator 69 determines that motor 30 is in the low-drive state that is easily affected by leak current only when current supplied to windings of motor 30 is below the current threshold, and executes the clock stop control only for a predetermined period by clock stop signal Stp. Conversely, stop signal generator 69 releases this clock stop control when current supplied to the windings exceeds the current threshold. With respect to detected motor current Di, V-phase detected motor current may be led out from U-phase detected motor current DiU and W-phase detected motor current DiW to determine the level of DC value by rotating coordinate conversion. In other words, the current threshold may be a current value that an influence of leak current on the motor current due to PWM switching signal becomes small, and is 10% to 20% of the rated motor current.

Instead of the configurations in FIG. 6 and FIG. 7, a configuration for setting clock stop signal Stp to a high level when at least motor speed Spd or detected motor current Di exceeds the threshold (speed threshold or current threshold), and outputting clock stop signal Stp by stop determination signal described in the first exemplary embodiment when a value is below the threshold is also applicable.

In the above description, stop signal generators 19, 59, and 69 are configured with a logic circuit as an example. However, software may be used in the motor control method. More specifically, the motor control method may be achieved such that the clock stop signal with predetermined pulse width is generated based on a timing of change of PWM switching signal, and the clock is stopped for a period of the predetermined pulse width using the clock stop signal.

The above configuration can reduce deterioration in detection accuracy in the servo-locked state and at low-speed rotation when an influence of leak current increases.

INDUSTRIAL APPLICABILITY

In the present invention, the motor control device detects motor current, using the ΔΣ AD converter and AD conversion decimating filter. The AD conversion clock is stopped according to the clock stop signal generated at PWM switching timing to reduce deterioration in detection accuracy due to leak current at PWM switching. Accordingly, undesired torque generated in the motor is reduced, and thus a minute vibration can be suppressed. This is effectively applicable, in particular, to control devices for controlling a motor by detecting motor current.

The invention claimed is:
1. A motor control device including a motor current detector for detecting current in windings to control an operation of a motor with a stator having the windings of three phases, the motor control device comprising:
a digital controller for outputting a PWM switching signal based on an operation command from a host device, positional information from an encoder, and a detected motor current value that is a value of current in the windings;
a power converter for applying drive voltage to the windings by turning on and off a switching element according to the PWM switching signal;
the motor current detector for converting current flowing in the windings by the drive voltage to analog voltage;
a ΔΣ AD converter for converting the analog voltage to a 1-bit digital signal;
an AD conversion decimating filter for converting the 1-bit digital signal to a multi-bit digital signal, and outputting the multi-bit digital signal as the detected motor current value;
a clock generator for generating a clock for operating the ΔΣ AD converter and the AD conversion decimating filter; and
a stop signal generator for generating a clock stop signal that stops the clock of the clock generator for a predetermined period,
wherein
the stop signal generator generates the clock stop signal with a predetermined pulse width based on a timing of change of the PWM switching signal, and
the clock generator uses the clock stop signal to stop the clock for a period of the predetermined pulse width.
2. The motor control device of claim 1,
wherein
the stop signal generator generates a stop determination signal for each phase with a pulse width from the timing of change of the PWM switching signal to a predetermined time, and outputs the clock stop signal to stop the clock when the stop determination signals for all three phases overlap.
3. The motor control device of claim 1,
wherein
the stop signal generator generates a stop determination signal for each phase with a pulse width from the timing of change of the PWM switching signal to a predetermined time, and outputs the clock stop signal to stop the clock in a range that the stop determination signals for at least any two phases overlap.
4. The motor control device of claim 1,
wherein
the stop signal generator generates a stop determination signal for each phase with a pulse width from the timing of change of the PWM switching signal to a predetermined time, and outputs the clock stop signal to stop the clock when the stop determination signal is present in at least any one phase.
5. The motor control device of claim 2,
wherein
the stop signal generator outputs the clock regardless of the stop determination signal when at least the detected motor current value or a motor speed is not less than a predetermined value.
6. The motor control device of claim 3,
wherein
the stop signal generator outputs the clock regardless of the stop determination signal when at least the detected motor current value or a motor speed is not less than a predetermined value.
7. The motor control device of claim 4,
wherein
the stop signal generator outputs the clock regardless of the stop determination signal when at least the detected motor current value or a motor speed is not less than a predetermined value.
8. A motor control method of a motor control device for controlling an operation of a motor with a stator having windings of three phases, the motor control device including:
a digital controller for outputting a PWM switching signal based on an operation command from a host device, positional information from an encoder, and a detected motor current value that is a value of current in the windings;

a power converter for applying drive voltage to the windings by turning on and off a switching element according to the PWM switching signal;

a motor current detector for converting current flowing in the windings by the drive voltage to analog voltage;

a ΔΣ AD converter for converting the analog voltage to a 1-bit digital signal;

an AD conversion decimating filter for converting the 1-bit digital signal to a multi-bit digital signal, and outputting the multi-bit digital signal as the detected motor current value;

a clock generator for generating a clock for operating the ΔΣ AD converter and the AD conversion decimating filter; and a stop signal generator for generating a clock stop signal that stops the clock of the clock generator for a predetermined period, the motor control method comprising:

generating the clock stop signal with a predetermined pulse width based on a timing of change of the PWM switching signal; and stopping the clock for a period of the predetermined pulse width, using the clock stop signal.

* * * * *